United States Patent [19]
DeLange et al.

[11] Patent Number: 5,092,635
[45] Date of Patent: Mar. 3, 1992

[54] BUTTRESS THREAD FORM

[75] Inventors: Richard W. DeLange, Kingwood; Merle E. Evans, Spring; Donna S. Anderson, Houston, all of Tex.

[73] Assignee: Baker Hughes Incorporated, Houston, Tex.

[21] Appl. No.: 516,138

[22] Filed: Apr. 27, 1990

[51] Int. Cl.⁵ .................................... F16L 15/00
[52] U.S. Cl. ............................. 285/334; 285/332.3; 285/355; 285/390
[58] Field of Search ................... 285/332.3, 333, 334, 285/355, 55, 364, 390

[56] References Cited

U.S. PATENT DOCUMENTS

| | | | |
|---|---|---|---|
| 929,027 | 7/1909 | Schuhmann . | |
| 1,927,656 | 9/1933 | Eaton | 285/146 |
| 1,973,848 | 9/1934 | Duffy | 285/146 |
| 2,063,407 | 12/1936 | Eaton . | |
| 2,207,005 | 7/1940 | Haas . | |
| 2,532,632 | 12/1950 | MacArthur | 285/146 |
| 2,636,753 | 4/1953 | Griffin | 285/151 |
| 2,772,102 | 11/1956 | Webb | 285/334 |
| 3,050,318 | 8/1962 | Van der Wissel | 285/334 |
| 3,079,181 | 2/1963 | Van der Wissel | 285/334 |
| 3,109,672 | 11/1963 | Franz | 285/334 |
| 3,359,013 | 12/1967 | Knox . | |
| 3,468,563 | 9/1969 | Duret | 285/93 |
| 3,508,771 | 4/1970 | Duret | 285/334 |
| 3,989,284 | 11/1976 | Blose . | |
| 4,153,283 | 5/1979 | Hellmund et al. . | |
| 4,161,332 | 7/1979 | Blose | 285/334 |
| 4,244,607 | 1/1981 | Blose | 285/92 |
| 4,373,754 | 2/1983 | Bollfrass | 285/334 |
| 4,438,953 | 3/1984 | Timme | 285/93 |
| 4,494,777 | 1/1985 | Duret | 285/55 |
| 4,521,042 | 6/1985 | Blackburn et al. . | |
| 4,549,754 | 10/1985 | Saunders et al. | 285/334 |
| 4,600,225 | 7/1986 | Blose | 285/332.2 |
| 4,647,085 | 3/1987 | Anderson | 285/333 |
| 4,703,954 | 11/1987 | Ortloff et al. | 285/334 |
| 4,707,001 | 11/1987 | Johnson | 285/332.3 |
| 4,730,857 | 3/1988 | Schwind | 285/390 |
| 4,762,344 | 8/1988 | Perkins et al. | 285/332.3 |
| 4,828,295 | 5/1989 | Plaquin et al. | 285/332.3 |
| 4,844,510 | 7/1989 | Theiss et al. | 285/334 |
| 4,865,364 | 9/1989 | Nobileau | 285/334 |

FOREIGN PATENT DOCUMENTS 677647  12/1964  Italy .................................. 285/334

Primary Examiner—Randolph A. Reese
Assistant Examiner—Tim Aberle
Attorney, Agent, or Firm—Rosenblatt & Assoc.

[57] ABSTRACT

The overall description of this invention is a truncated buttress-type thread form that incorporates a reverse-angle tension load flank with a compression flank and a torque shoulder; the thread does not have any radial interference designed into it, but the hooked tension flank does tend to pull the pin and box together once the torque shoulder is engaged. The mating compression flanks have designed into them a minimum amount of clearance prior to the shouldering action, which then closes to zero or very near zero at the moment the shoulder is engaged. This drawing together is due to the tendency of the hooked threads to pull together at shouldering if there exists no radial interference in the thread body. The thread roots and crests can be tapered, parallel to the taper of the thread body, or flat and parallel to the pipe axis but maintain adequate clearance to allow some closure once the shoulder is engaged so that the compression flanks can draw together.

14 Claims, 2 Drawing Sheets

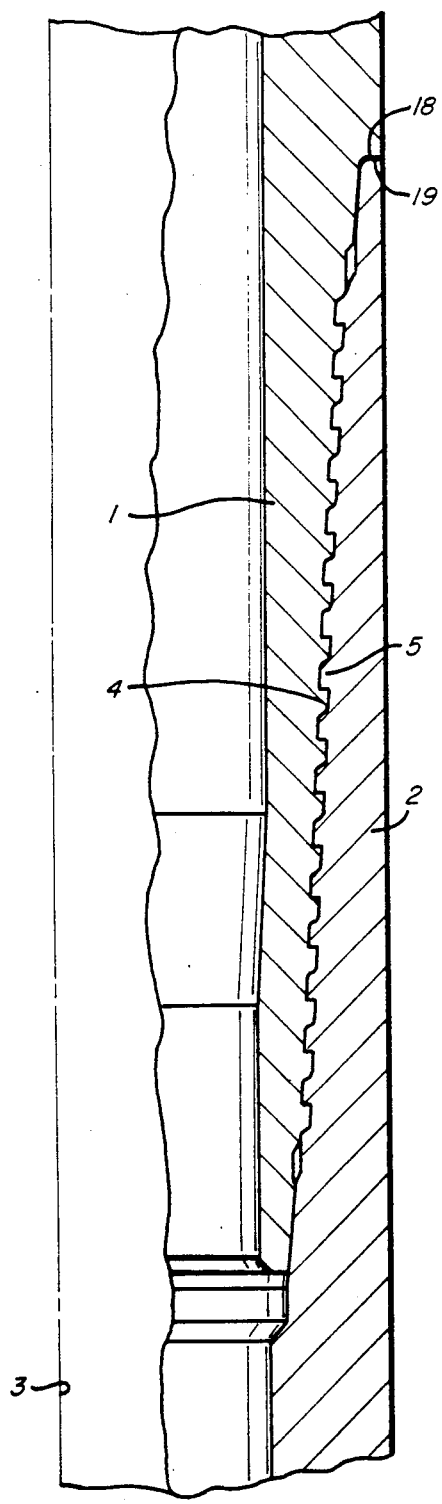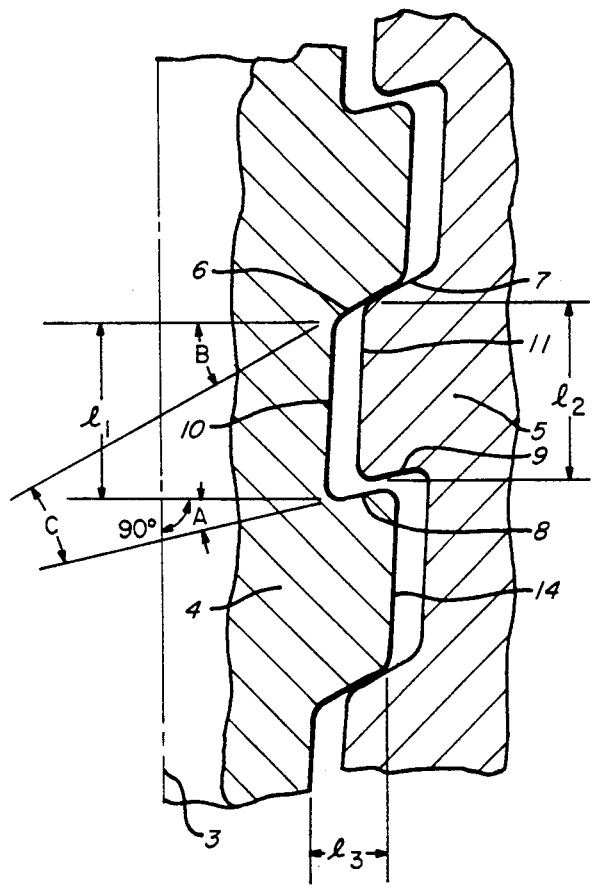
FIG. 1
FIG. 2

BUTTRESS THREAD FORM

FIELD OF THE INVENTION

The field of this invention relates to the field of pipe joints.

BACKGROUND OF THE INVENTION

The threads used in connecting basing and tubing pipes together in the oil and gas industry is the single most important part of the overall connector design. These threads are required to resist mechanical loads that often can reach over one million pounds but will not seize or gall after repeated make-ups. They determine the overall characteristics of the connector since a problem in the threads can weaken even the best-designed seals and torque shoulders.

Over the last five decades, major advancements have been developed in thread design beyond the original V-shaped thread forms. The most successful threads used in the oil and gas industry have been the tapered V-shaped threads, and these threads were expected to perform all the duties of the connector, including pressure sealing while maintaining mechanical strength. As the industry attempted to drill and complete wells with deeper and deeper depths and higher pressures, the simple V-shaped thread began to show its limits. One of the most popular designs introduced after the V-shaped was the straight, noninterference thread form, which is still very popular today in tubing connectors. This approach removed the sealing duties from the threads by incorporating metal-to-metal interference-fit seals and torque shoulders. By specializing the different parts of the connector for different functions, the connector became a little more predictable. The straight thread has remained popular because of its smooth running characteristics in the field.

The next generation of threads designed into connectors for high-performance pressure sealing and strength was the tapered, buttress-type thread form. These threads have always used radial interference to generate torque that helps resist downhole back-off, which has been one of the weaknesses of the straight thread design. Like the straight threads, these tapered thread bodies were used in connectors that incorporated specialized seals and shoulders.

But even though these two major design categories were successful over numerous decades of use, they each had limits as to their performance capabilities. The straight thread form, with no radial interference, experienced from time to time downhole back-offs caused by heat cycling and rotating the string of pipe. And, while the tapered interference-fit thread did not suffer this weakness, it often generated too much circumferential stress in the box, especially during make-up and from applied internal pressure. Both of these thread forms suffered a weakness that has become a major problem as well pressures continue to rise and the depths continue to go deeper. The problem is that the threads provided no way for the pin and box to lock together radially, which would allow resistance to pressure inside the pipe that somehow could migrate up into the space between the pin and box. These older thread designs also had the tendency to "jump out" under very high tension or bending loads because the amount of metal available on the end of a piece of pipe, even with forged ends or coupling, is never adequate for the incorporation of big, tough-thread teeth that could resist such loads. It is an impossible task to accurately predict the loads these connectors go through 3–5 miles under the surface of the Earth.

These weaknesses have brought on numerous products over the last ten years or so that incorporate a hooked or locking-type thread form. These threads utilize at least one of the load flanks being reverse angled or hooked such that when tension loads are applied, the connectors basically draw together or get tighter. This has been a solid breakthrough for the industry, but these designs all have some weaknesses, mostly with resisting compressive or bending loads. Others that do not have this drawback are so sophisticated that the cost of production is very high.

The weakness in compression or bending with the current products on the market is created by the clearance these forms require on the compression flank of the thread tooth. The hooked tension flanks work great, but when bending (compression on one side and tension on the opposite side) or compression is applied in any great quantities, the thread body has no way of carrying those loads because there is no contact on that side of the thread tooth. This usually means that the torque shoulders have to carry these loads and the shoulders are sometimes pressure seals or are adjacent pressure seals. Axial strain generated from this applied compression can be very detrimental to these seals and shoulders.

This invention includes a thread form design that offers the locking effect so important in today's oil and gas industry but also provides the compressive and bending strength absent in most designs. This means a thread form design that is truly rigid as it can resist extremely high tension loads without experiencing jumpout, is equally capable of carrying the applied compressive and bending loads, and is adequately capable of locking the box and pin together should high gas pressures migrate up into the interstitial space between the pin and box. This invention provides the smooth running and low stress characteristics of the straight or noninterference-fit thread form. This invention is cost effective.

SUMMARY OF THE INVENTION

The overall description of this invention is a truncated buttress-type thread form that incorporates a reverse-angle tension load flank with a compression flank and a torque shoulder; the thread does not have any radial interference designed into it, but the hooked tension flank does tend to pull the pin and box together once the torque shoulder is engaged. The mating compression flanks have designed into them a minimum amount of clearance prior to the shouldering action, which then closes to zero or very near zero at the moment the shoulder is engaged. This drawing together is due to the tendency of the hooked threads to pull together at shouldering if there exists no radial interference in the thread body. The thread roots and crests can be tapered, parallel to the taper of the thread body, or flat and parallel to the pipe axis but maintain adequate clearance to allow some closure once the shoulder is engaged so that the compression flanks can draw together.

BRIEF DESCRIPTION OF THE DRAWINGS

FIG. 1 shows the preferred embodiment of the invention.

FIG. 2 shows the configuration during assembly.

DETAILED DESCRIPTION OF THE PREFERRED EMBODIMENT

FIG. 1 shows a threaded connection comprising a pin member 1 and a box member 2 with torque shoulders 18 and 19 machined so as to form an axis 3.

Figure 3:
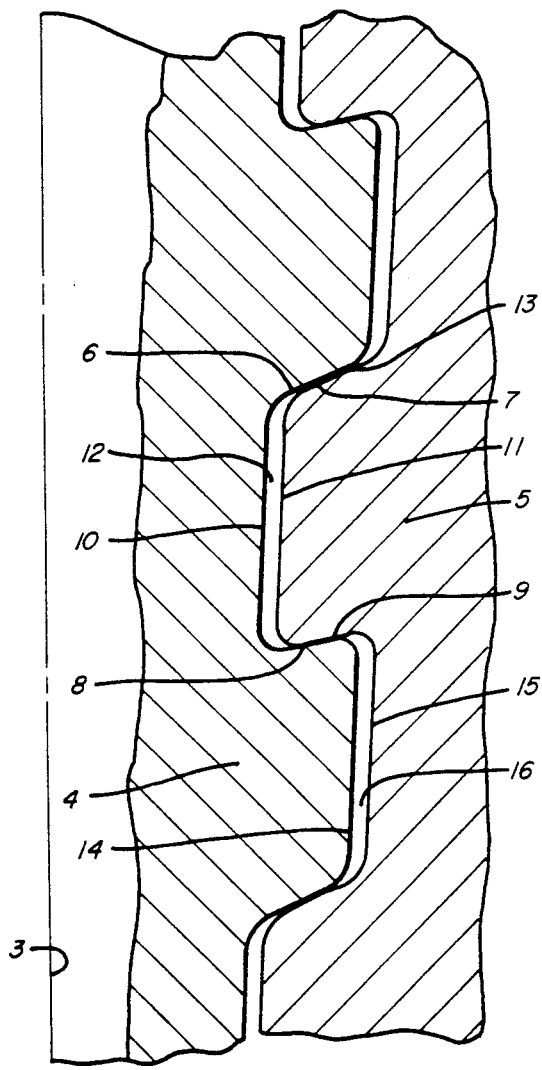
FIG. 3 shows the configuration as the torque shoulders touch.

FIG. 2 shows the general configuration of the thread form. The pin thread 4 is comprised of a crest 14, a root 10 having a length 11, a load flank 8, and a stab flank 6. The load flank 8 makes an angle A to a line drawn perpendicular to the axis 3 of the thread such that the crest 14 overhangs the root 10, forming what is known as a "hooked thread." The stab flank 6 forms an angle B to a line drawn perpendicular to the axis 3 of the thread. The angle B is chosen so that the included angle C formed by the load flank 8 and the stab flank 6 is greater than zero degrees. The box thread is designed such that the angles of the load flank 9 and the stab flank 7 are the same as those of the pin. Furthermore, the length 12 of the box crest 11 is greater than the length 11 of the pin thread root 10. The thread height 13 can vary greatly, ranging from 0.020 inches to 0.100 or greater. The preferred angle A is 13 degrees, but can range from 5–15 degrees or greater, but in any event needs to be greater than the friction angle which exists at the surfaces 8 and 9 at the time of assembly. The friction angle is dependent upon many factors such as the lubricant used, plating on the thread surfaces 8 and 9, the overall condition of the surfaces 8 and 9, the temperature, and many others. Angle C is preferably 13 degrees, but can range from 5–60 degrees. The angle B is determined by the angles A and C. The length 11 and, therefore, 12 also will be determined by the pitch of the thread and the clearances desired between the surfaces 6 and 7 upon initial assembly. The clearances 12, 13, and 16 in FIG. 3 must be chosen carefully so that upon final assembly, the gap 13 will close sufficiently to begin to share any applied compression load with the compression shoulders 8 and 9. FIG. 2 shows the configuration of the threads during assembly. Upon stabbing of the downward-facing pin 1 into the upward-facing box 2, initial contact is made by the pin thread flank 6 touching the box thread flank 7. Upon further screwing, the shoulders 18 and 19 will touch. After further screwing, the flank 8 of the pin thread 4 will come into contact with flank 9 of the box thread 5, as shown in FIG. 3. Referring to FIG. 3, small gaps 12 and 16 need to exist between surfaces 10 and 11 and 14 and 15, respectively.

Figure 4:
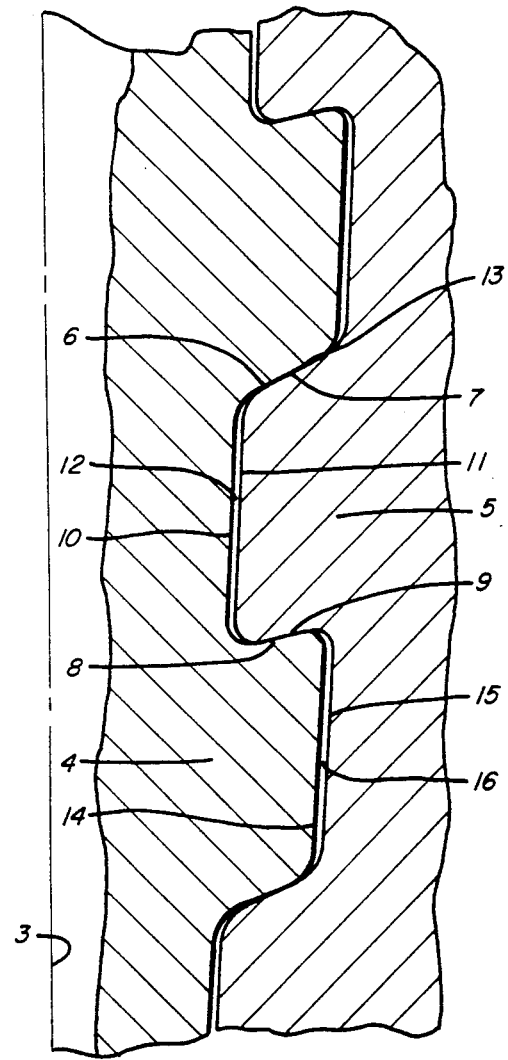
FIG. 4 shows the final configuration of the hooked threads.

Upon even further screwing, the box thread 5 and pin thread 4 will be drawn closer together because of the hooking effect derived from angle A. The gaps 12 and 16 will continue to narrow until the flanks 6 and 7 come into contact as shown in FIG. 4. One should note that, because of manufacturing tolerances in the lead of the thread and the manufacture of the threading tools, a small gap 13 may exist on some portion of the threads after final assembly. It is believed that at least 50 percent of the thread length will have no clearance at the flank areas; however, due to manufacturing tolerances, the 50 percent may not be continuous or at any specific location on the thread. The tolerances must be chosen such that the gap 13 will be closed or sufficiently narrow, under 0.003 inch, after final assembly so that upon application of compression load to the connection, the gap will close and the flanks 6 and 7 of the threads will begin to share the applied compression load with the compression shoulders 8 and 9 before the applied compression load damages the shoulders 8 and 9.

The thread profile can be straight, tapered, or stepped thread.

A combination of dimensions known to the inventors to be preferred in practicing the invention is given by the table below:

| | |
|---|---|
| 11 = | 0.095 inch |
| 12 = | 0.093 inch |
| 13 = | 0.050 inch |
| angle A = | 13 degrees |
| angle B = | 25 degrees |
| angle C = | 12 degrees |
| Pitch = | 5 threads/inch |
| Thread taper = | 1.5 inches/foot on diameter |

The foregoing disclosure and description of the invention are illustrative and explanatory thereof, and various changes in the size, shape and materials, as well as in the details of the illustrated construction, may be made without departing from the spirit of the invention.

We claim:

1. A thread form for a joint connecting two pipes comprising:
   a pin having a root, a crest, a compression flank on one side of said pin root, and a tension flank on the other side of said pin root;
   a box having a root, a crest, a compression flank on one side of said box root, and a tension flank on the other side of said box root;
   said pin crests overlapping in part said pin roots;
   said box crests overlapping in part said box roots;
   a torque shoulder on said pin;
   a torque shoulder on said box;
   whereupon torquing the joint beyond initial contact between said box and pin torque shoulders, said pin and box tension and compression flanks are in respective contact over at least a portion of the length of the thread form such that compressive loads on the pipes are transferred substantially through the thread form rather than said pin and box shoulders;
   said box crest is spaced from said pin root when the joint is torqued beyond initial contact of said pin and box torque shoulders;
   said pin crest is spaced from said box root when the joint is torqued beyond initial contact of said pin and box torque shoulders; and
   wherein said box crest is longer than said pin root.

2. The apparatus of claim 1, wherein any clearance which may exist along any portion of the pin and box compression flanks does not exceed 0.003 inches.

3. The apparatus of claim 1, wherein said tension and compression flanks of said pin and box are respectively in contact for at least 50 percent of their helical length.

4. The apparatus of claim 1, wherein said tension and compression flanks of said pin and box are respectively in contact for about 100 percent of their length.

5. The apparatus of claim 1, wherein:
   said compression flanks of said pin and box are initially in contact until said pin and box shoulders contact;
   whereupon further torquing draws said box and pin tension flanks into contact and separates said compression flanks on said box and pin;

whereupon final torquing brings said box in toward said pin creating a negative hoop stress in said box and allowing substantially all compressive loads to be transferred through the thread form, through the portions of said pin and box tension and compression flanks which are in respective contact.

6. The apparatus of claim 1, wherein said pin draws in said box, reducing root/crest clearance as the joint is torqued.

7. The apparatus of claim 6, wherein the included angle between said tension and compression flanks on said pin and said box is in the range of 5-60 degrees.

8. The apparatus of claim 7, wherein the included angle between said tension and compression flanks on said pin and said box is about 13 degrees.

9. The apparatus of claim 7, wherein said tension flanks are disposed at an angle exceeding the friction angle of said tension flanks as measured from an axis perpendicular to the longitudinal axis of the joint.

10. The apparatus of claim 9, wherein said tension flanks are disposed about 13 degrees from an axis perpendicular to the longitudinal axis of the joint.

11. The apparatus of claim 5, wherein the thread height is in the range of about 0.020 to 0.100 inches.

12. The apparatus of claim 11, wherein any clearance which may exist during any portion of the pin and box compression flanks does not exceed 0.003 inches.

13. A thread form for a joint connecting two pipes comprising:
- a pin having a root, a crest, a compression flank on one side of said pin root, and a tension flank on the other side of said pin root;
- a box having a root, a crest, a compression flank on one side of said box root, and a tension flank on the other side of said box root;
- said pin crests overlapping in part said pin roots;
- said box crests overlapping in part said box roots;
- a torque shoulder on said pin;
- a torque shoulder on said box;
- whereupon torquing the joint beyond initial contact between said box and pin torque shoulders, said pin and box tension and compression flanks are in respective contact over at least a portion of the length of the thread form such that compressive loads on the pipes are transferred substantially through the thread form rather than said pin and box shoulders;
- wherein said box crest is longer than said pin root.

14. A thread form for a joint connecting two pipes comprising:
- a pin having a root, a crest, a compression flank on one side of said pin root, and a tension flank on the other side of said pin root;
- a box having a root, a crest, a compression flank on one side of said box root, and a tension flank on the other side of said box root;
- said pin crests overlapping in part said pin roots;
- said box crests overlapping in part said box roots;
- a torque shoulder on said pin;
- a torque shoulder on said box;
- whereupon torquing the joint beyond initial contact between said box and pin torque shoulders, said pin and box tension and compression flanks are in respective contact over at lest a portion of the length of the thread form such that compressive loads on the pipes are transferred substantially through the thread form rather than said pin and box shoulders;
- wherein said box crest is spaced from said pin root when the joint is torqued beyond initial contact of said pin and box torque shoulders;
- wherein said box crest is longer than said pin root.

* * * * *